United States Patent
Zhang et al.

(10) Patent No.: US 8,005,963 B2
(45) Date of Patent: Aug. 23, 2011

(54) METHOD AND APPARATUS FOR PREVENTING COUNTERFEITING OF A NETWORK-SIDE MEDIA ACCESS CONTROL ADDRESS

(75) Inventors: Qun Zhang, Shenzhen (CN); Bo Ke, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 273 days.

(21) Appl. No.: 12/503,427

(22) Filed: Jul. 15, 2009

(65) Prior Publication Data

US 2009/0282152 A1 Nov. 12, 2009

Related U.S. Application Data

(63) Continuation of application No. PCT/CN2008/071196, filed on Jun. 5, 2008.

(30) Foreign Application Priority Data

Jun. 8, 2007 (CN) .......................... 2007 1 0110698

(51) Int. Cl.
*G06F 15/16* (2006.01)
*G06F 15/173* (2006.01)
*G06F 7/04* (2006.01)

(52) U.S. Cl. ............ 709/227; 709/223; 709/225; 726/2; 726/3

(58) Field of Classification Search .......... 709/223–229; 726/1–3, 22–23
See application file for complete search history.

(56) References Cited

U.S. PATENT DOCUMENTS

| | | | |
|---|---|---|---|
| 6,115,376 A | 9/2000 | Sherer et al. | |
| 7,234,163 B1 * | 6/2007 | Rayes et al. | 726/22 |
| 7,263,559 B2 | 8/2007 | Yao et al. | |
| 7,320,070 B2 * | 1/2008 | Baum | 713/153 |
| 2004/0213172 A1 * | 10/2004 | Myers et al. | 370/313 |
| 2005/0050365 A1 * | 3/2005 | Seki et al. | 713/201 |
| 2005/0055570 A1 | 3/2005 | Kwan et al. | |
| 2006/0114863 A1 * | 6/2006 | Sanzgiri et al. | 370/338 |

(Continued)

FOREIGN PATENT DOCUMENTS

CN     1466341 A     1/2004

(Continued)

OTHER PUBLICATIONS

Written Opinion of the International Searching Authority in corresponding PCT Application No. PCT/CN2008/071196 (Sep. 18, 2008).

*Primary Examiner* — Joshua Joo (74) *Attorney, Agent, or Firm* — Leydig, Voit & Mayer, Ltd.

(57) ABSTRACT

A method and apparatus is provided for preventing the counterfeiting of a network-side Media Access Control (MAC) address. The method includes: receiving a message from a user equipment (UE) and resolving the message from the UE in order to obtain a MAC address of the UE; learning the MAC address of the UE if the MAC address of the UE is different from a known MAC address of a network-side equipment; learning the MAC address of the network-side equipment; and generating a MAC address learning table by utilizing the learned MAC address of the network-side equipment and setting the MAC address learning table to be a static address table, and/or filtering messages having source MAC addresses being the MAC address of the network-side equipment and from other user-side ports by utilizing the learned MAC address of the network-side equipment.

14 Claims, 3 Drawing Sheets

U.S. PATENT DOCUMENTS

| | | | |
|---|---|---|---|
| 2006/0209818 A1* | 9/2006 | Purser | 370/389 |
| 2008/0134291 A1 | 6/2008 | Wu et al. | |
| 2009/0254973 A1* | 10/2009 | Kwan | 726/2 |
| 2009/0260083 A1* | 10/2009 | Szeto et al. | 726/22 |

FOREIGN PATENT DOCUMENTS

| | | |
|---|---|---|
| CN | 1855812 A | 11/2006 |
| JP | 11-122303 A | 4/1999 |
| WO | WO 2004/025926 A1 | 3/2004 |

\* cited by examiner

METHOD AND APPARATUS FOR PREVENTING COUNTERFEITING OF A NETWORK-SIDE MEDIA ACCESS CONTROL ADDRESS

CROSS-REFERENCE TO RELATED APPLICATIONS

This application is a continuation of International Patent Application No. PCT/CN2008/071196, filed Jun. 5, 2008, which claims priority to Chinese Patent Application No. 200710110698.2, filed Jun. 8, 2007, each of which is hereby incorporated by reference in their entirety.

FIELD OF THE TECHNOLOGY

The present invention relates to an Internet broadband access technology and the field of network security, and more particularly to a method and apparatus for preventing a network-side media access control address from being counterfeited.

BACKGROUND

With the maturity of Internet technologies and continuous popularization of services, the broadband access service has been developed rapidly. However, how to ensure the broadband users' security of using the broadband services and the security of network operators is a key problem to be solved. For example, an access user counterfeits a media access control (MAC) address of a broadband remote access server (BRAS) to initiate an application of point-to-point protocol over Ethernet (PPPoE) or dynamic host configuration protocol (DHCP), which causes a migration of a MAC address learning table of the broadband remote access server (BRAS) on an access equipment from a network-side port to a user-side port and thus results in the interruption of other users' services.

Considering the current development mode of the broadband service, a user accesses a network to use the broadband service in generally two manners, namely, PPPoE authentication and DHCP authentication.

The PPPoE protocol provides a broadband access means for a user using a bridged Ethernet to access, and meanwhile provides convenient access control and charging.

The DHCP protocol is put forward on the basis of a bootstrap protocol (BOOTP), and its function is to provide configuration information for a host in the network. The DHCP employs a client/server mode, in which a client initiates to a server a configuration application including an allocated IP address, a subnet mask, a default gateway and other parameters, and the server returns corresponding configuration information according to policies.

In order to solve the problem that a network-side MAC address is counterfeited, which results in that the service of other access users is interrupted, a source MAC address filter function is configured on the user-side port of the access equipment in the conventional art, i.e., a source MAC address filter table is manually configured on the user-side port of the access equipment to prohibit an access user from using a MAC address in the filter table as a source address. If the access user uses an address in the filter table, the access equipment discards the message.

As can be seen from the above method provided in the conventional art, when the BRAS is changed or an active BRAS at the network-side is handed over, the source MAC address filter table of the user-side port needs to be reconfigured. The configuration is dependent on a specific MAC address of an upper-layer network equipment, i.e., the source MAC address filter table stores the MAC address of the upper-layer equipment. If the upper-layer equipment is changed, the source MAC address filter table of the access equipment needs to be modified, which causes a large network administration and maintenance workload. Since a large number of access user ports exist, the source MAC address filter function is configured for the user-side ports one by one, which causes a large maintenance workload of the network administrator. Therefore, in the creation of the present invention, the inventor finds that the conventional art at least has the following problem: a source MAC address filter table needs to be configured manually on a user-side port of access equipment, which causes a large network administration and maintenance workload.

SUMMARY

In order to solve the technical problems, various embodiments of the present invention provide a method and apparatus for preventing a network-side media access control (MAC) address from being counterfeited, which automatically prevents the network-side MAC address from being counterfeited and enhances convenience for administration and maintenance.

In an embodiment a method for preventing a network-side MAC address from being counterfeited is provided. The method includes the following steps.

A message from a user equipment (UE) is received, and the message of the UE is resolved to obtain a MAC address of the UE.

The MAC address of the UE is learned if the MAC address of the UE is different from a known MAC address of a network-side equipment.

The MAC address of the network-side equipment is learned.

A MAC address learning table is generated by utilizing the learned MAC address of the network-side equipment, and the generated MAC address learning table is set to be a static address table, and/or messages from other user-side ports and with source MAC addresses being the MAC address of the network-side equipment are filtered by utilizing the learned MAC address of the network-side equipment.

In an embodiment, an apparatus for preventing a network-side MAC address from being counterfeited is provided. The apparatus includes an acquisition unit, a judgment unit, and a learning unit.

The acquisition unit is adapted to acquire a MAC address of a UE.

The judgment unit is adapted to judge whether the MAC address of the UE acquired by the acquisition unit is a known MAC address of a network-side equipment.

The learning unit is adapted to learn the MAC address of the UE and the MAC address of the network-side equipment when a judgment result of the judgment unit is that the MAC address of the UE is not the known MAC address of the network-side equipment.

The apparatus further includes an address table generation unit and/or a filter unit.

The address table generation unit is adapted to generate a MAC address learning table based on the learned MAC address of the network-side equipment, in which the MAC address learning table is set to be a static MAC address table.

The filter unit is adapted to filter messages from other user-side ports and with source MAC addresses being the MAC address of the network-side equipment by utilizing the learned MAC address of the network-side equipment.

In an embodiment, an access equipment connecting a user to a network is provided to obtain network services. The access equipment includes an acquisition unit, a judgment unit, and a learning unit.

The acquisition unit is adapted to receive a message from a UE and resolve the message from the UE to obtain a MAC address of the UE.

The judgment unit is adapted to judge whether the MAC address of the UE acquired by the acquisition unit is a known MAC address of a network-side equipment.

The learning unit is adapted to learn the MAC address of the UE and learn the MAC address of the network-side equipment to generate a MAC address learning table including the MAC address of the network-side equipment when a judgment result of the judgment unit is that the MAC address of the UE is not the known MAC address of the network-side equipment.

The apparatus further includes an address table generation unit and/or a filter unit.

The address table generation unit is adapted to generate the MAC address learning table based on the learned MAC address of the network-side equipment, in which the MAC address learning table is set to be a static MAC address table.

The filter unit is adapted to filter messages from other user-side ports and with source MAC addresses being the MAC address of the network-side equipment by utilizing the learned MAC address of the network-side equipment.

With the method and apparatus for preventing the network-side MAC address from being counterfeited provided in the embodiments of the present invention, when the MAC address of the UE is not the MAC address of the network-side equipment, the access equipment is allowed to learn the MAC addresses of the UE and the network-side equipment so as to prevent the MAC address learning table from being relocated, thereby automatically preventing the user from counterfeiting the network-side equipment to access the network, preventing other ports from learning the MAC address of the network-side equipment to counterfeit the MAC address of the network-side equipment and being more convenient for administration and maintenance.

BRIEF DESCRIPTION OF THE DRAWINGS

The present invention will become more fully understood from the detailed description given herein below for illustration only, when taken in conjunction with the accompanying drawings among which.

DETAILED DESCRIPTION

Figure 1:
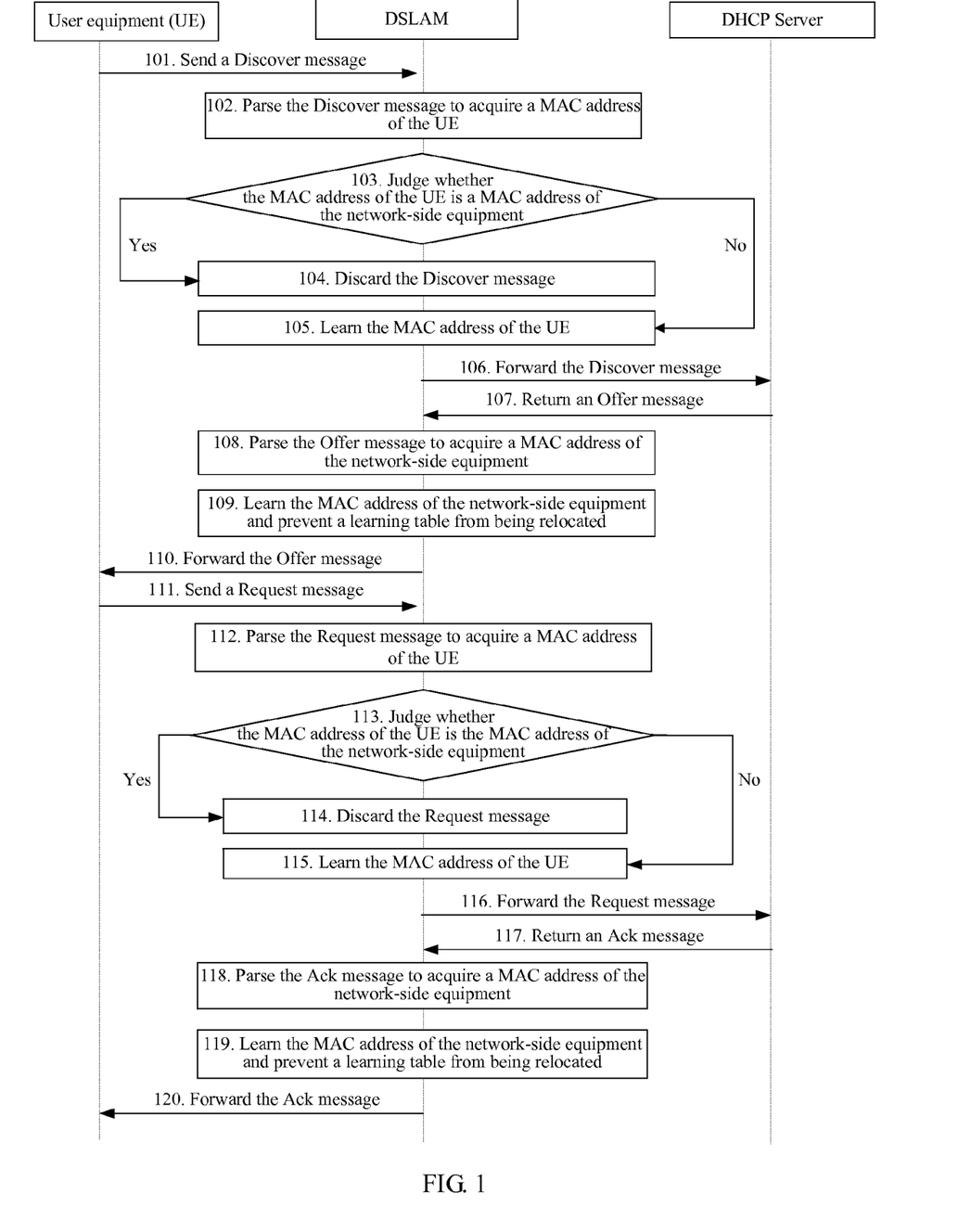
FIG. 1 is a signaling flow chart of a method for preventing a network-side MAC address from being counterfeited according to a first embodiment of the present invention.

In order to clarify the technical solution of the present invention, the present invention is illustrated in detail below through embodiments by reference to the accompanying drawings. FIG. 1 is a signaling flow chart of a method for preventing a network-side MAC address from being counterfeited according to a first embodiment of the present invention. An application scenario of this embodiment is that a user applies to network-side equipment for allocating an IP address by employing the DHCP technology, and the user accesses the network-side equipment for the first time. The main process of the method includes the following steps.

In Step 101, a UE sends a Discover message to an access equipment to find a DHCP server.

In this embodiment, the access equipment is a digital subscriber line access multiplexer (DSLAM).

In Step 102, the access equipment parses the received Discover message to acquire a source MAC address of the received Discover message, i.e., a MAC address of the UE.

In Step 103, it is judged whether the MAC address of the UE acquired by the access equipment is a known MAC address of network-side equipment. If the MAC address of the UE is a known MAC address of network-side equipment, Step 104 is performed. Otherwise, Step 105 is performed.

The known MAC address of network-side equipment may be a MAC address of a network-side equipment recorded in the access equipment. For example, the access equipment may acquire the MAC address of the network-side equipment in the network by virtue of a routing protocol or an address resolution protocol (ARP) and store the acquired MAC address of the network-side equipment in the access equipment. In this embodiment, the network-side equipment is the DHCP server.

In Step 104, the Discover message is discarded so as to prevent the user from counterfeiting the MAC address of the network-side equipment, for example, counterfeiting a MAC address of a BRAS.

In Step 105, the access equipment learns the acquired MAC address of the UE.

In Step 106, the access equipment forwards the Discover message to the network-side equipment.

In Step 107, the network-side equipment returns an Offer message to the access equipment, with the Offer message carrying information of the network-side equipment.

The information of the network-side equipment includes an IP address of the network-side equipment, a MAC address of the network-side equipment, etc.

In Step 108, the access equipment parses the received Offer message to acquire a source MAC address of the Offer message, i.e., a MAC address of the network-side equipment.

In Step 109, the access equipment learns the MAC address of the network-side equipment, records the learned MAC address of the network-side equipment in the access equipment, and performs an operation of preventing a MAC address learning table from being relocated so as to prevent learning the MAC address of the network-side equipment from other ports.

The operation of preventing the MAC address learning table from being relocated specifically includes: generating the MAC address learning table by utilizing the MAC address of the network-side equipment, where MAC address learning table is set to be a static MAC address table so that the MAC address of the network-side equipment is locked to prevent the learned MAC address being deleted with the elapse of time; and/or configuring a logic chip to filter messages which have source MAC addresses identical with the MAC address of the network-side equipment and are from other user-side ports by utilizing the learned MAC address of the network-side equipment. For example, setting the learned MAC address of the network-side equipment into a MAC address filter table of the logic chip or storing the learned MAC address in the access equipment to provide MAC address query and filtering.

In Step 110, the access equipment forwards the Offer message to the UE, with the Offer message carrying information of the network-side equipment.

In Step 111, the UE sends a Request message to the access equipment to request the network-side equipment to allocate an IP address for the user.

In Step 112, the access equipment parses the received Request message to acquire a source MAC address of the received Request message, i.e., a MAC address of the UE.

In Step 113, it is judged whether the MAC address of the UE acquired by the access equipment is the known MAC address of network-side equipment. If the MAC address of the UE is the known MAC address of network-side equipment, Step 114 is performed. Otherwise, Step 115 is performed.

In Step 114, the Request message is discarded to prevent the user from counterfeiting the MAC address of the network-side equipment.

In Step 115, the access equipment learns the acquired MAC address of the UE.

In Step 116, the access equipment forwards the Request message to the network-side equipment.

In Step 117, the network-side equipment allocates an IP address for the user and returns an ACK message carrying the IP address allocated for the user to the access equipment.

In Step 118, the access equipment parses the received ACK message to acquire a source MAC address of the ACK message, i.e., a MAC address of the network-side equipment.

In Step 119, the access equipment learns the MAC address of the network-side equipment, records the learned MAC address of the network-side equipment in the access equipment, and performs an operation of preventing a MAC address learning table from being relocated so as to prevent learning the MAC address of the network-side equipment from other ports.

The operation of preventing the MAC address learning table from being relocated specifically includes: generating the MAC address learning table by utilizing the MAC address of the network-side equipment, where the MAC address learning table is set to be a static MAC address table, so that the MAC address of the network-side equipment is locked to prevent the learned MAC address being deleted with the elapse of time; and/or configuring the logic chip to filter messages having source MAC addresses being the MAC address of the network-side equipment and from other user-side ports by utilizing the learned MAC address of the network-side equipment. For example, setting the learned MAC address of the network-side equipment into a MAC address filter table of the logic chip or storing the learned MAC address in the access equipment to provide MAC address query and filtering.

In Step 120, the access equipment forwards the ACK message to the UE, with the ACK message carrying the IP address allocated by the network-side equipment for the user.

If the user has passed an access authentication of the network-side equipment before, Steps 101 to 110 may be omitted.

Figure 2:
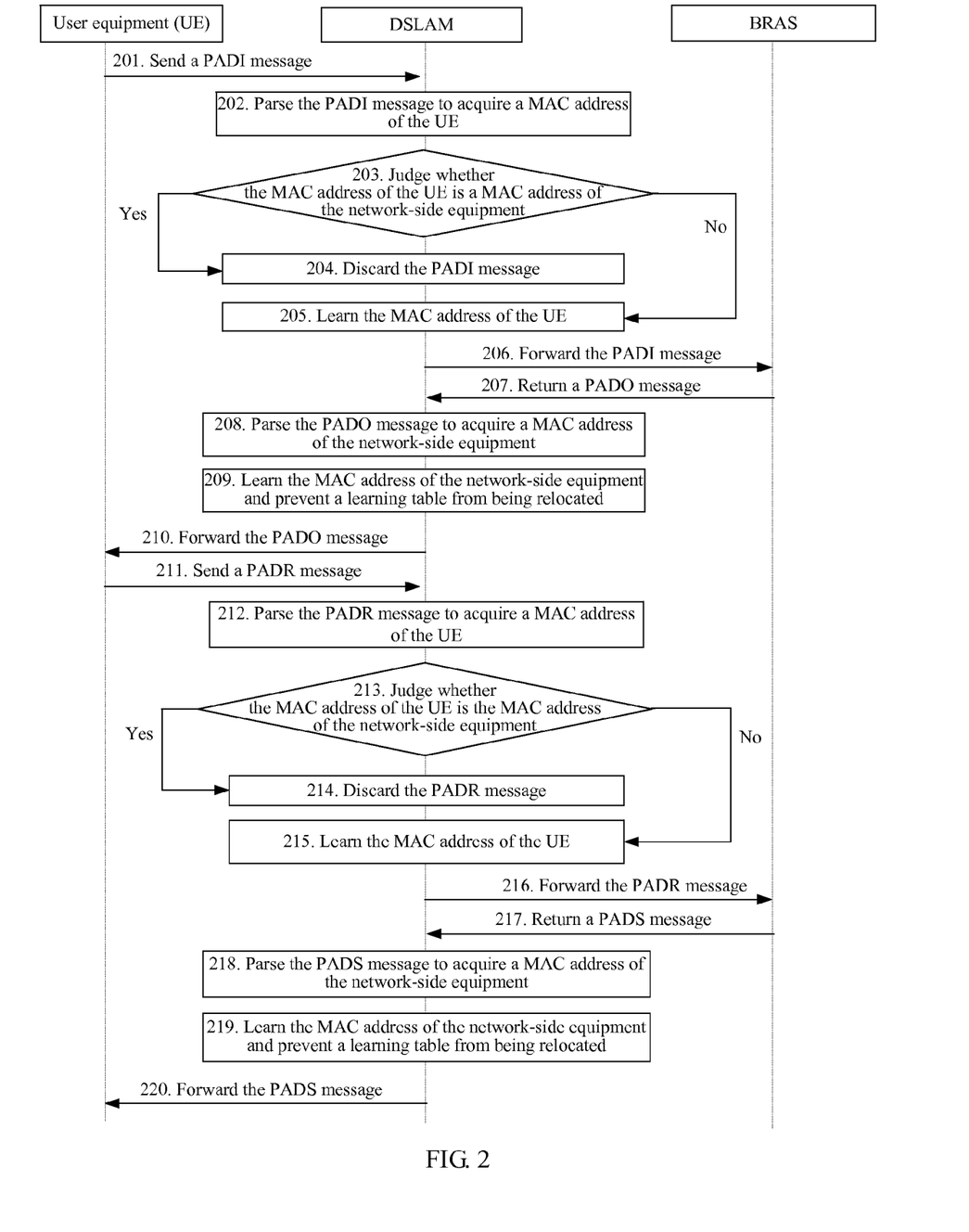
FIG. 2 is a signaling flow chart of a method for preventing a network-side MAC address from being counterfeited according to a second embodiment of the present invention.

FIG. 2 is a signaling flow chart of a method for preventing a network-side MAC address from being counterfeited according to a second embodiment of the present invention. An application scenario of this embodiment is that a user requests an establishment of a session by employing the PPPoE technology. The main process of the method includes the following steps.

In Step 201, a UE sends a PPPoE active discovery initialization (PADI) message to an access equipment to request session establishment services.

In this embodiment, the access equipment is a digital subscriber line access multiplexer (DSLAM).

In Step 202, the access equipment receives the PADI message from the UE, and parses the received PADI message to acquire a source MAC address of the received PADI message, i.e., a MAC address of the UE.

In Step 203, it is judged whether the MAC address of the UE acquired by the access equipment is a known MAC address of network-side equipment. If the MAC address of the UE is a known MAC address of network-side equipment, Step 204 is performed. Otherwise, Step 205 is performed.

The access equipment may learn a MAC address of a network-side equipment by virtue of a routing protocol or other methods. In this embodiment, the network-side equipment is a BRAS.

In Step 204, the PADI message is discarded so as to prevent the user from counterfeiting the MAC address of the network-side equipment, for example, counterfeiting a MAC address of the BRAS.

In Step 205, the access equipment learns the acquired MAC address of the UE.

In Step 206, the access equipment forwards the PADI message to the network-side equipment.

In Step 207, the network-side equipment returns a PPPoE active discovery offer (PADO) message to the access equipment, with the PADO message carrying information of the network-side equipment.

The information of the network-side equipment includes a MAC address of the network-side equipment, etc.

In Step 208, the access equipment parses the received PADO message to acquire a source MAC address of the PADO message, i.e., a MAC address of the network-side equipment.

In Step 209, the access equipment learns the MAC address of the network-side equipment, records the learned MAC address of the network-side equipment in the access equipment, and performs an operation of preventing a MAC address learning table from being relocated so as to prevent the MAC address of the network-side equipment from being learned from other ports.

For example, a static MAC address learning table may be generated, or a logic chip may be configured such that the logic chip filters messages which have source MAC addresses identical with the MAC address of the network-side equipment and are from other user-side ports by utilizing the learned MAC address of the network-side equipment or the generated MAC address table.

In Step 210, the access equipment forwards the PADO message to the UE, with the PADO message carrying information of the network-side equipment.

In Step 211, the UE sends a PPPoE active discovery request (PADR) message to the access equipment to request the session establishment services.

In Step 212, the access equipment parses the received PADR message to acquire a source MAC address of the received PADR message, i.e., a MAC address of the UE.

In Step 213, it is judged whether the MAC address of the UE acquired by the access equipment is the known MAC address of the network-side equipment. If the access equipment is a known MAC address of network-side equipment, Step 214 is performed. Otherwise, Step 215 is performed.

In Step 214, the PADR message is discarded to prevent the user from counterfeiting the MAC address of the network-side equipment.

In Step 215, the access equipment learns the acquired MAC address of the UE.

In Step 216, the access equipment forwards the PADR message to the network-side equipment.

In Step 217, the network-side equipment provides a session service establishment connection to the user and returns a PPPoE active discovery session-confirmation (PADS) message to the access equipment.

In Step 218, the access equipment parses the received PADS message to acquire a source MAC address of the PADS message, i.e., a MAC address of the network-side equipment.

In Step 219, the access equipment learns the MAC address of the network-side equipment, generates the MAC address learning table, and performs an operation of preventing a MAC address learning table from being relocated so as to prevent the MAC address of the network-side equipment from being learned from other ports.

For example, the MAC address learning table may be set to be a static MAC address table, so that the MAC address of the network-side equipment is locked to prevent the learned MAC address of the network-side equipment from being deleted with the elapse of time; and/or a logic chip is configured to filter messages which have source MAC addresses identical with the MAC address of the network-side equipment and are from other user-side ports by utilizing the learned MAC address of the network-side equipment or the generated MAC address table including the MAC address of the network-side equipment.

In Step 220, the access equipment forwards the PADS message to the user.

Figure 3:
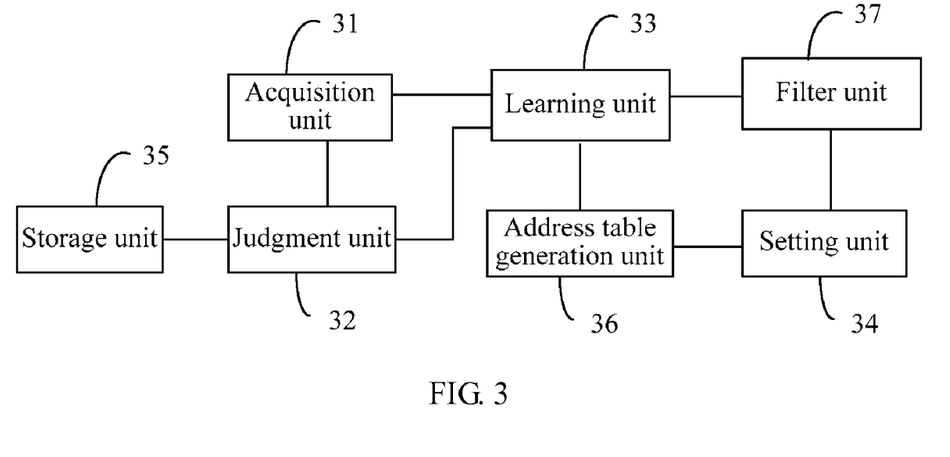
FIG. 3 is a structural view of an apparatus for preventing a network-side MAC address from being counterfeited according to an embodiment of the present invention.

FIG. 3 is a structural view of an apparatus for preventing a network-side MAC address from being counterfeited according to an embodiment of the present invention.

The apparatus includes an acquisition unit 31, a judgment unit 32, a learning unit 33, and may further include a setting unit 34, a storage unit 35, an address table generation unit 36, and a filter unit 37.

The acquisition unit 31 is adapted to acquire and store a MAC address of a UE. The storage unit 35 is adapted to store an acquired MAC address of the network-side equipment. The judgment unit 32 is adapted to judge whether the MAC address of the UE acquired by the acquisition unit 31 is the MAC address of the network-side equipment stored in the storage unit 35. The learning unit 33 is adapted to learn the MAC address of the UE and the MAC address of the network-side equipment when a judgment result of the judgment unit 32 is that the MAC address of the UE is not the MAC address of the network-side equipment. Specifically, the MAC address of the network-side equipment may be learned in at least one of the following manners: acquiring the MAC address of the network-side equipment by a routing protocol; acquiring the MAC address of the network-side equipment by an ARP; and acquiring the MAC address of the network-side equipment from a response message of the network-side equipment. The address table generation unit 36 is adapted to generate a MAC address learning table by utilizing the MAC address learned by the learning unit 33. The setting unit 34 is adapted to set the MAC address learning table to be a static MAC address table so as to prevent the MAC address learning table generated by the learning unit 33 from being relocated. The setting unit 34 may also configure the learned network-side MAC address into the filter unit 37. The filter unit 37 performs a source MAC address filter function by a logic chip. The logic chip of the filter unit 37 records a MAC address filter table and can be configured to filter messages having source MAC addresses being the MAC address of the network-side equipment and from other user-side ports by utilizing the MAC address filter table. Or, for example, the filter unit 37 may have an engine function to obtain by query the MAC address of the network-side equipment from the MAC address learning table so as to be filtered. The address table generation unit 36 may be configured to directly set an attribute of the MAC address learning table to be static during the generation of the MAC address learning table according to the learned MAC address of the network equipment.

Referring to FIGS. 1, 2 and 3, the communication system provided in the embodiments of the present invention includes the access equipment, the UE, and the network-side equipment. The access equipment is mainly adapted to provide a variety of access means to access the user to the network so as to acquire network services. The UE is mainly adapted to provide a client function of user access. The network-side equipment is mainly adapted to provide relevant information of the network services.

The access equipment, for example, the DSLAM, provides a user-side port and a network-side port. The user-side port is adapted to connect the user, and the network-side port is connected to a local area network (LAN), a metropolitan area network (MAN), or a core network. The access equipment has address tables stored thereon including a static address table and a dynamic address table. The static address table is generally configured on the equipment manually and is characterized in that the table is stored in the equipment all along once it is configured and is not deleted with the elapse of time. The dynamic address table is generally generated by the equipment through learning automatically and is characterized in that the table is automatically deleted after being stored in the equipment for a period of time. According to the embodiments of the present invention, the access equipment can generate the static MAC address table according to the learned network-side MAC address so as to prevent the MAC address learning table from being relocated, and/or the access equipment can be configured to filter messages having source MAC addresses being the MAC address of the network-side equipment and from other user-side ports by utilizing the learned MAC address of the network-side equipment. The access equipment may learn the MAC address of the network-side equipment in at least one of the following manners: acquiring the MAC address of the network-side equipment by a routing protocol; acquiring the MAC address of the network-side equipment by an ARP; and receiving a response message of the network-side equipment and acquiring the MAC address of the network-side equipment.

The network-side equipment is, for example, the DHCP server shown in FIG. 1 and the BRAS shown in FIG. 2. As shown in FIG. 1, a server/client mode is employed between the DHCP server and the UE, in which a client submits to a server a configuration application including an allocated IP address, a subnet mask, a default gateway, and other parameters, and the server returns corresponding configuration information including the allocated IP address, the subnet mask, the default gateway, and other parameters according to policies. With the above method and apparatus for automatically preventing the network-side MAC address from being counterfeited provided in the embodiments of the present invention, only when the MAC address of the UE is not the MAC address of the network-side equipment, the access equipment is allowed to learn the MAC addresses of the UE and the network-side equipment to prevent the MAC address learning table from being relocated, thereby preventing the user from counterfeiting the network-side equipment to access the network, preventing learning the MAC address of the network-side equipment from other ports to counterfeit the MAC address of the network-side equipment and being more convenient for administration and maintenance.

A method and apparatus for preventing the network-side MAC address from being counterfeited provided in the present invention is introduced in detail above. Specific instances are applied herein to elaborate the principles and implementation of the present invention, but the illustration of the above embodiments is merely intended to help understand the technical schemes disclosed in the present invention. Meanwhile, it is apparent to those of ordinary skill in the art that changes can be made to the specific implementation and application scope of the present invention based on the concept of the invention. In view of the above, the contents of the specification shall not be considered as a limitation to the present invention.

What is claimed is:

1. A method for preventing counterfeiting of a network-side media access control (MAC) address, comprising:
   receiving a message from a user equipment (UE), and parsing the message of the UE to obtain a MAC address of the UE;
   learning the MAC address of the UE if the MAC address of the UE is different from a known MAC address of a network-side equipment stored in a storage unit;
   learning a MAC address of the network-side equipment when the MAC address of the UE is different from the known MAC address of the network-side equipment stored in the storage unit;
   generating a MAC address learning table by utilizing the learned MAC address of the network-side equipment and setting the MAC address learning table to be a static address table, and
   filtering messages transmitted by the UE by utilizing the learned MAC address of the network-side equipment, the filtered messages having source MAC addresses identical with the MAC address of the network-side equipment and transmitted from other user-side ports.

2. The method according to claim 1, learning the MAC address of the network-side equipment comprising: acquiring the MAC address of the network-side equipment through one of a routing protocol, an address resolution protocol, and a response message of the network-side equipment.

3. The method according to claim 1, further comprising: discarding the message of the UE if the MAC address of the UE is the same as the known MAC address of the network-side equipment.

4. The method according to claim 1, further comprising:
   if the MAC address of the UE is different from the known MAC address of the network-side equipment,
   forwarding the message from the UE;
   receiving an acknowledgement message returned by the network-side equipment; and
   determining the MAC address of the network-side equipment according to a source MAC address of the acknowledgement message.

5. The method according to claim 1, wherein the messages transmitted from the UE include at least one of a discovery message for requesting the network-side equipment allocate an IP address for a user and a message for requesting a session establishment.

6. The method according to claim 2, wherein the messages transmitted from the UE include at least one of a discovery message for requesting the network-side equipment to allocate an IP address for a user and a message for requesting a session establishment.

7. The method according to claim 4, wherein the messages transmitted from the UE include at least one of a discovery message for requesting the network-side equipment allocate an IP address for a user and a message for requesting a session establishment.

8. An apparatus for preventing counterfeiting of a network-side media access control (MAC) address, comprising:
   a storage unit configured to store an acquired MAC address of a network-side equipment;
   an acquisition unit, configured to receive a message from a user equipment (UE) and parse the message from the UE to obtain a MAC address of the UE;
   a judgment unit, configured to judge whether the MAC address of the UE acquired by the acquisition unit is the acquired MAC address stored in the storage unit;
   a learning unit, configured to learn the MAC address of the UE and a MAC address of the network-side equipment when the judgment unit determines that the MAC address of the UE is not the acquired MAC address stored in the storage unit;
   an address table generation unit configured to generate a MAC address learning table based on the learned MAC address of the network-side equipment, the MAC address learning table being a static address table; and
   a filter unit configured to filter messages by utilizing the learned MAC address of the network-side equipment, the filtered messages having source MAC addresses identical with the MAC address of the network-side equipment and transmitted from other user-side ports.

9. The apparatus according to claim 8, the learning unit further configured to:
   obtain the MAC address of the network-side equipment through one of a routing protocol, an address protocol, and
   a response message of the network-side equipment.

10. The apparatus according to claim 8, wherein the message transmitted from the UE include at least one of a discovery message for requesting the network-side equipment to allocate an IP address for a user and a message for requesting a session establishment.

11. The apparatus according to claim 8, further comprising:
   a setting unit, configured to set the MAC address learning table generated by the address table generation unit to be the static MAC address table and configured to configure the learned MAC address of the network-side equipment into the filter unit.

12. An access equipment for providing a user with an access to a network to obtain network services, the access equipment comprising:
   a storage unit configured to store an acquired MAC address of a network-side equipment;
   an acquisition unit, configured to receive a message from a user equipment (UE) and resolve the message from the UE to obtain a media access control (MAC) address of the UE;
   a judgment unit, configured to judge whether the MAC address of the UE acquired by the acquisition unit is the acquired MAC address stored in the storage unit;
   a learning unit, configured to learn the MAC address of the UE and learn a MAC address of the network-side equipment to generate a MAC address learning table comprising the MAC address of the network-side equipment when the judgment unit determines that the MAC address of the UE is not the acquired MAC address stored in the storage unit;
   an address table generation unit configured to generate the MAC address learning table based on the learned MAC address of the network-side equipment, the MAC address learning table being set to be a static MAC address table; and a filter unit configured to filter messages by utilizing the learned MAC address of the network-side equipment, the filtered messages having source MAC addresses identical with the MAC address of the network-side equipment and transmitted from other user-side ports.

13. The access equipment according to claim 12, the learning unit further comprising: acquiring the MAC address of the network-side equipment through one of a routing protocol, an address resolution protocol (ARP), and a response message of the network-side equipment.

14. The access equipment according to claim 12, wherein the messages transmitted from the UE include at least one of a discovery message for requesting the network-side equipment allocate an IP address for a user and a message requesting a session establishment.

* * * * *